Feb. 29, 1944.   A. G. EDISON ET AL   2,343,174
TREATMENT FOR POLYAMIDES
Filed Aug. 2, 1940    2 Sheets-Sheet 1

Winfield W. Heckert
Austin G. Edison
INVENTORS

BY
ATTORNEY

Feb. 29, 1944.   A. G. EDISON ET AL   2,343,174
TREATMENT FOR POLYAMIDES
Filed Aug. 2, 1940   2 Sheets-Sheet 2

Winfield W. Heckert
Austin G. Edison
INVENTORS

BY *Louis A. Wilts*
ATTORNEY

Patented Feb. 29, 1944

2,343,174

UNITED STATES PATENT OFFICE 2,343,174

TREATMENT FOR POLYAMIDES

Austin G. Edison and Winfield W. Heckert, Wilmington, Del., assignors to E. I. du Pont de Nemours & Company, Wilmington, Del., a corporation of Delaware Application August 2, 1940, Serial No. 349,934

7 Claims. (Cl. 260—78)

This invention relates to the recovery of synthetic linear polyamides, and more particularly it relates to improvements in process and apparatus for the degradation and repolymerization of synthetic linear polyamides.

The term "synthetic linear polyamide," as used throughout the following specification and claims, designates, specifically, the new class of fiber-forming synthetic linear polyamides described in Carothers U. S. Patents Nos. 2,071,250, 2,071,253 and 2,130,948. These polyamides are of two main types; those obtainable from monoaminomonocarboxylic acids and their amide-forming derivatives, including caprolactam and those obtainable from suitable diamines and dibasic carboxylic acids. Also contemplated are interpolymers containing amide groups, such as ester-amides. In these linear polyamides, the amide groups occur as linkages in the main chain of atoms.

Synthetic linear polyamides have been used heretofore in the production of filaments, yarns, sheets, films, coating and adhesive compositions and other useful articles. The production of articles from synthetic linear polyamides involves the accumulation of considerable polyamide waste material. In view of the cost of preparing synthetic linear polyamides, it is particularly desirable to recover the synthetic linear polyamides from accumulated polyamide waste as well as from articles comprising the polyamides.

Although it might be expected that such waste material might be recovered by melting and reforming into the desired article from the melt, this is not practical on a large scale. The polyamides at about their melting points are quite viscous and it is very difficult to obtain uniform blending of various scraps. Furthermore, it is practically impossible to remove all of the occluded and trapped oxygen from the scrap material. Consequently, the recovery of scrap by remelting would result in a very badly discolored product since the molten material is very readily attacked by oxygen with resulting discoloration. Also, because of the voluminous character of waste yarn (as well as other waste articles), it is very difficult to effect the transfer of heat to the yarn for the purpose of remelting it. This latter characteristic would result in other difficulties such as requiring the maintenance of a larger quantity of the material in the molten state (thus causing more rapid decomposition of the material and variations in physical and chemical properties attendant thereon) and the necessity for larger equipment or more frequent charging of the equipment.

The co-pending application of Wesley R. Peterson, Serial No. 350,021, filed of even date herewith, discloses a process and apparatus for the depolymerization of synthetic linear polyamide material and the polymerization of the resultant residue whereby to recover synthetic linear polyamide which would ordinarily be wasted or discarded.

It is an object of this invention to provide an improved method and apparatus for recovering synthetic linear polyamides from articles comprising the same.

It is a further object of this invention to provide an improved process and apparatus for obtaining fiber-forming synthetic linear polyamides from scrap material comprising the same. Other objects of the invention will appear hereinafter.

The objects of this invention are accomplished, in general, by heating synthetic linear polyamide waste, or articles comprising synthetic linear polyamides in the presence of water or steam until degradation of the polyamide to a fluid mass occurs. The heating and degradation of the polyamide are carried out in a heating chamber having a direct connection with an autoclave. As the polyamide is degraded to the fluid state it passes from the heating chamber to the autoclave. During and after the degradation of the polyamide to the fluid state, the water or steam is gradually bled from the system, and the fluid mass of polyamide is repolymerized in the autoclave. The degradation of the polyamide does not involve complete hydrolysis to the monomer but rather partial hydrolysis to a fluid state under the temperature and pressure conditions present in the heating chamber and the autoclave.

The objects of the invention can, in certain limited cases, be achieved in a less advantageous manner by condensing the vapor of a non-degrading solvent for the polyamide on the polyamide waste held in a heating chamber, and causing the resulting liquid polyamide-solvent mixture to be transferred to an autoclave where the polyamide is recovered. This is particularly true of interpolyamides which are more readily soluble in common solvents, for example ethanol-water mixtures, and for low melting polyamides.

The invention can be more easily understood by reference to the accompanying drawings when taken in connection with the following detailed description.

Figure 1:
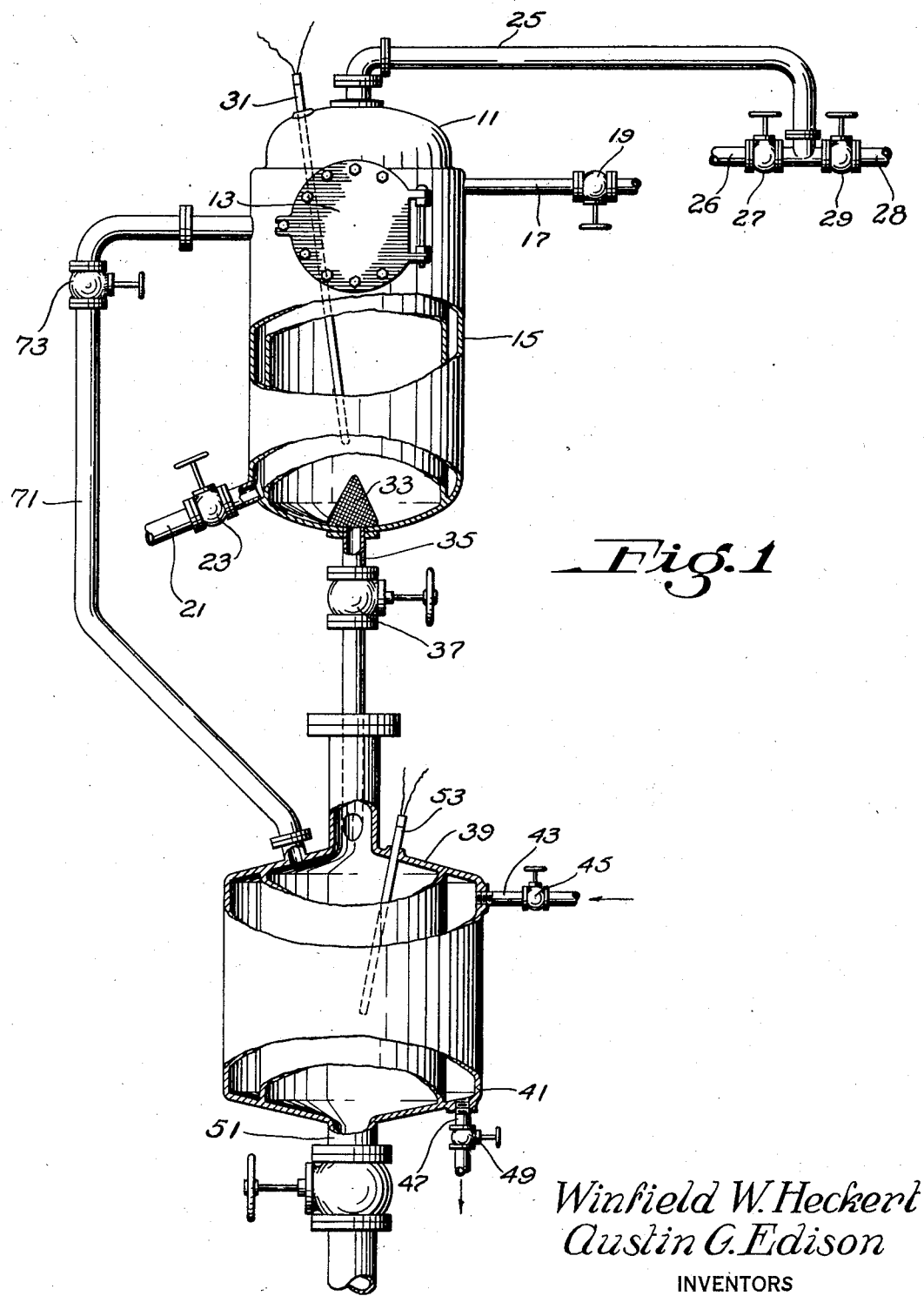
Figure 1 is a front elevational view, with parts shown in section, of a heating chamber and autoclave, constructed of stainless steel or other material, suitable for use in accordance with the present invention.

With reference to the apparatus shown in the drawings, reference numeral 11 designates a heating chamber for the waste polyamide material. The heating chamber 11 is provided with a hinged door 13 which may be firmly fastened in closed position in the chamber.

The chamber 11 is provided with a heating jacket 15. A heating medium, such as steam or Dowtherm vapors (a mixture of diphenyl and diphenyl-ether) may be passed into the heating jacket 15 through a conduit 17. The flow of the heating medium may be controlled by means of a valve 19. The condensed heating medium may be withdrawn from the heating chamber through conduit 21, controlled by valve 23. The heating chamber 11 is provided with an inlet conduit 25, which conduit is connected to branch conduits 26 and 28. Branch conduit 28 may be connected to a means for creating a vacuum such as a vacuum pump or the like (not shown). Branch conduit 26 may be connected to a source of inert gas such as nitrogen. The branch conduit 26 will be provided with a conventional means for passing the gas into conduit 25 under pressure. This may be accomplished by means of a pump or the like not shown in the drawings. The heating chamber is also preferably provided with a thermocouple 31 by means of which the temperature of the interior of the chamber may be recorded.

The heating chamber 11 is connected to an autoclave 39 by means of a connecting conduit 35. A screen 33 is preferably positioned in the bottom of the heating chamber 11 at the point where the conduit 35 is connected to the chamber. The conduit 35 is provided with a control valve 37. The conduit 35 is also preferably provided with a pressure release valve 55, the valve 55 opening as a result of a given pressure in conduit 35. The upper part of the heating chamber and the autoclave may also be connected by a pressure equalizing line 71 (controlled by valve 73) which may or may not be necessary for transferring the contents of the heating chamber to the autoclave depending on the size of conduit 35. The autoclave 39 is provided with a heating jacket 41. A heating medium such as steam or Dowtherm vapors may be passed into the heating jacket 41 through conduit 43 and valve 45. Condensed heating medium may be withdrawn from the jacket 41 through conduit 47 and valve 49. The autoclave is provided with an outlet 51 which may, if desired, be provided with a round or slitlike orifice and thereby permit the extrusion of molten polyamide in the form of rods or ribbons. If desired, the molten polyamide may even be extruded directly from the autoclave in the form of yarn or monofils or film. The autoclave is also preferably provided with a thermocouple 53 for recording the temperature of the material in the autoclave. The autoclave is also provided with an inlet conduit 57, which conduit is connected to branch conduits 58 and 60. Branch conduit 60 may be connected to means for the creation of a vacuum, and this conduit is controlled by means of valve 61. Branch conduit 58 may be connected to a source of inert gas such as nitrogen which may be pumped through branch conduit 58 into conduit 57 and the flow may be controlled by means of valve 59.

The apparatus disclosed in the drawings is adapted to operate as follows:

The door 13 is opened and a quantity of distilled water is charged into the heating chamber. The valve 37 is then opened, permitting the water to pass down into autoclave 39. The valve 37 is then closed, and a second quantity of distilled water is charged into the heating chamber 11 through door 13. Alternatively, the water for the autoclave can be charged directly into the autoclave by means of a pump or other means. Then, a proper quantity of synthetic linear polyamide waste, for example, polyhexamethylene adipamide yarn which has previously been freed from extraneous materials by washings, etc., is charged through the door opening into the heating chamber 11. The door 13 is then closed and fastened by means of bolts or the like. The heating chamber, and the autoclave, are both purged of air by evacuating three times and admitting nitrogen to about 50 pounds per square inch pressure after each evacuation. The alternate evacuation and admission of nitrogen gas into the heating chamber is carried out through conduit 25 and branch conduits 26 and 28. The alternate evacuation and admission of nitrogen gas into the autoclave is carried out through conduit 57 and branch conduits 58 and 60. An alternative method of purging may be used, if desired, using steam or some other suitable vapor or gas instead of nitrogen. The last charge of purging gas is reduced to atmospheric pressure before heat is applied to the system. Steam at about 100 pounds per square inch is passed into heating jacket 15 through conduit 17. Condensed steam may be withdrawn from jacket 15 through conduit 21. Dowtherm vapors are then passed into the heating jacket 41 of the autoclave through conduit 43. The condensed Dowtherm vapors may be withdrawn from the heating jacket 41 through conduit 47. When the temperature in the heating chamber 11 reaches about 160° C. the steam is cut off by valve 19. Further heat for the heating chamber 11 is furnished by opening valve 37 and permitting steam to escape from the autoclave into the heating chamber. The temperature of the heating chamber is brought up to approximately 210° C. by maintaining a pressure of 250 pounds per square inch in the autoclave and heating chamber and held there for approximately one hour. By this time the waste polymer yarn has become degraded and the fluid mass has passed down into the autoclave from the heating chamber. In some cases it may be necessary to open valve 73 of equalizing line 71 to facilitate the transfer of the contents of the heating chamber to the autoclave through conduit 35. Valve 37 is now closed and repolymerization is carried out in autoclave 39 by maintaining the pressure therein at 250 pounds per square inch while bleeding off steam until the temperature in the autoclave reaches approximately 275° C., then reducing the pressure in the autoclave to atmospheric pressure while maintaining the temperature of the polymer in the autoclave at 270–275° C. The polymer is passed from the autoclave through outlet conduit 51, and is cooled, cut, and dried. The dried polymer may be blended with other similar synthetic linear polyamide material if desired. Delustered polymer may be blended with bright polymer if desired. It is now ready for melt spinning or otherwise forming into shaped products such as yarn, bristle, or the like. The molten synthetic linear polyamide may be pumped from the autoclave by means of any conventional pumping mechanism or alternatively it may be forced from the autoclave by pressure of nitrogen passed into the autoclave through valve 59 and conduits 57 and 58.

The following examples are given to illustrate certain specific embodiments of the present invention, it being understood that the invention is not to be limited thereto.

EXAMPLE I

Figure 2:
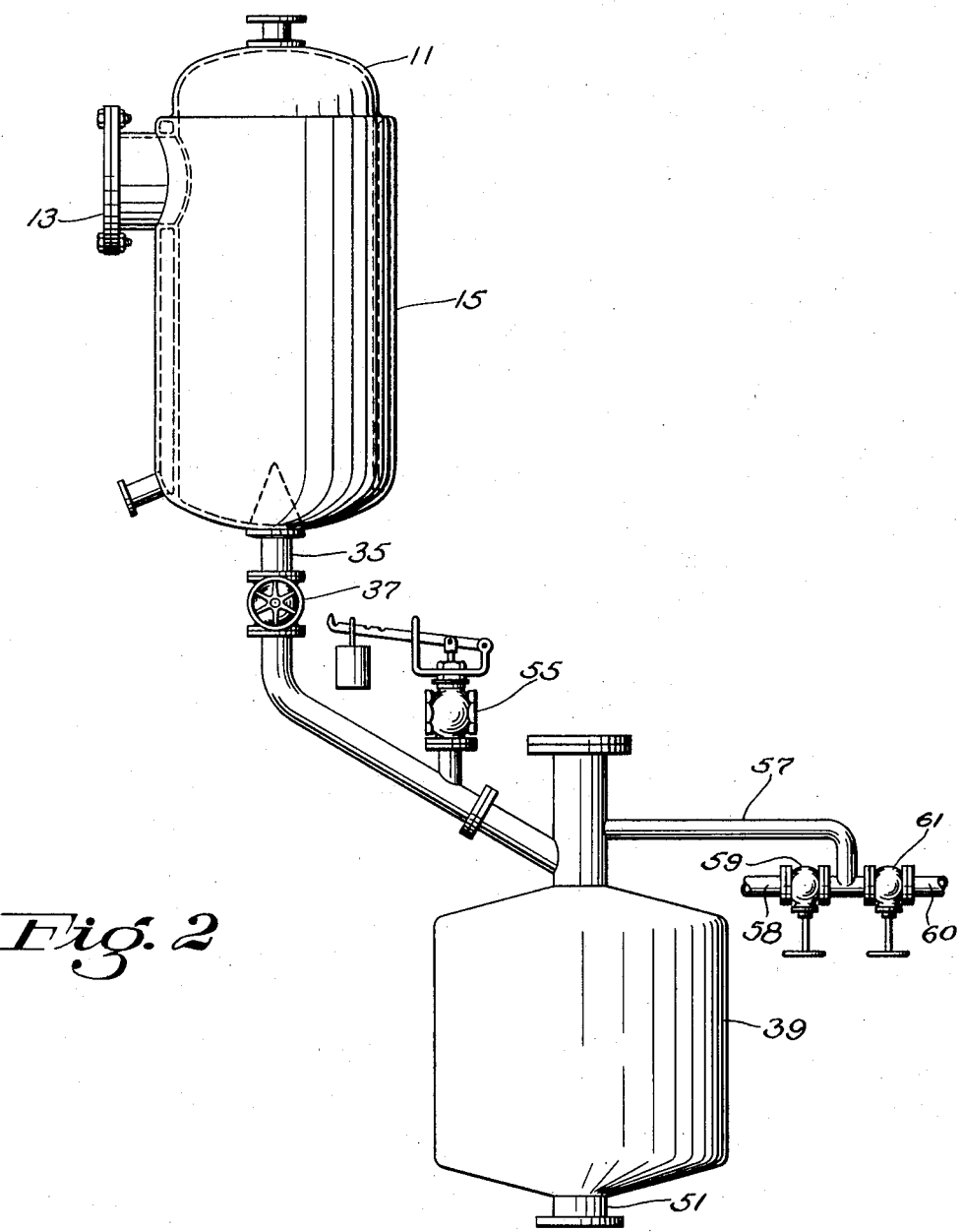
Figure 2 is a side elevational view of the main portions of the apparatus shown in Figure 1.

One thousand grams of water are charged into a heating chamber such as 11 shown in Figures 1 and 2 of the drawings, and permitted to run into the autoclave 39. Six hundred grams of waste polyhexamethylene adipamide yarn are charged into the chamber and the door 13 securely fastened in its closed position. With valve 37 open, the system is purged of air by evacuating both the heating chamber and autoclave three times and filling with nitrogen to about 50 pounds per square inch pressure between each evacuation. The last charge of nitrogen is then reduced to atmospheric pressure before the system is heated. Steam at 120 pounds per square inch is passed into the heating jacket 15 surrounding the heating chamber 11. Dowtherm vapors are simultaneously passed into heating chamber 41 of the autoclave. When the temperature in the autoclave reaches 175° C., the steam passing into heating jacket 15 is turned off. Heating of the autoclave is continued until the system reaches a temperature of about 210° C. and 250 pounds per square inch pressure. The system is held at this temperature and pressure for one hour. This results in degradation of the yarn to a fluid state and automatic transfer of the fluid from the heating chamber to the autoclave. The valve 37 is now closed and repolymerization of the fluid mass of polyamide is commenced. The repolymerization is carried out by bleeding off water vapor at a rate sufficient to maintain the pressure in the autoclave at 250 pounds per square inch. The temperature gradually rises to 275° C. The pressure in the autoclave is then reduced to atmospheric pressure at such a rate that the temperature is held constant at 275° C. The molten polymer is then passed from the autoclave, preferably by extruding the same in the form of a ribbon directly into cold water. The ribbon may then be cut into small chips or flakes which may be dried and charged into a melt spinning apparatus in a well-known manner.

EXAMPLE II

One hundred and thirty pounds of water are charged into a heating chamber such as 11 shown in the drawings. The valve 37 is maintained in the open position thus permitting the water to run into the autoclave. Valve 37 is then closed. Seventy pounds of water and 200 pounds of waste polyhexamethylene adipamide yarn are then charged into the heating chamber and the door 13 closed and securely bolted. The heating chamber and the autoclave are then purged of air by evacuating them three times and filling them with nitrogen to about 50 pounds per square inch pressure between each evacuation. The last charge of nitrogen is then reduced to atmospheric pressure before heating is started. The heating chamber is then heated with steam in the heating jacket 15 at about 75 pounds per square inch gauge pressure. The autoclave is heated with Dowtherm vapors. When the autoclave has reached a temperature of about 185° C. and a pressure of 150 pounds per square inch gauge, and the heating chamber has reached a temperature of about 160° C., the valve 37 is slowly opened. As soon as the heating chamber reaches a temperature of 175° C., the steam passing into heating jacket 15 is turned off, and further heating of the heating chamber is accomplished by the passage of steam from the autoclave. The temperature and pressure of the autoclave are gradually increased to about 210° C. and 250 pounds per square inch gauge pressure. The temperature is then held constant at about 210° C. for one hour at the end of which time valve 37 is closed, since by that time all of the yarn will have become degraded and the resulting fluid mass will have passed down into the autoclave. The heating chamber 11 is then cooled down preparatory to recharging the same with waste yarn. The repolymerization of the polyamide-forming materials is continued in the autoclave by bleeding off water vapor through valve 61 at a rate sufficient to maintain the pressure in the autoclave at 250 pounds per square inch. The temperature gradually rises to 275° C. The pressure in the autoclave is then reduced to atmospheric pressure, at such a rate that the temperature is held constant at 275° C. The molten polymer in the autoclave is then extruded in the form of a ribbon directly into cold water, and the resultant ribbon cut into small chips or flakes.

EXAMPLE III

A solution containing 184 pounds of the salt produced by reaction of hexamethylene diamine and adipic acid, 0.625 pound of acetic acid, and 0.635 pound of titanium dioxide added in the form of a slurry, in a total of 194.4 pounds of distilled water is charged into the autoclave of an apparatus such as shown in the drawings. The valve 37 is now closed. Sixteen pounds of waste yarn and 5.6 pounds of distilled water are now charged into the heating chamber. The door 13 is securely bolted in place, and both the heating chamber and autoclave are purged free of air as described above in Examples I and II. The heating chamber and autoclave are heated by means of steam and Dowtherm vapors, respectively. As soon as the temperature in the autoclave reaches 175° C. the steam passing into the heating chamber is turned off and the valve 37 is opened. The degradation of the waste yarn now gradually takes place and the resulting fluid mass flows into the autoclave and mixes with the solution therein. Polymerization, extrusion, drying, and cutting of the polymer is conducted similarly to the process outlined in Examples I and II.

EXAMPLE IV

A solution containing 5 parts of hexamethylene diammonium sebacate and 7 parts of distilled water are charged into the autoclave. Valve 37 is now closed. Then 5 parts of waste polyhexamethylene adipamide yarn and 3 parts of distilled water are charged into the heating chamber. Door 13 is securely bolted in place, and both the heating chamber and autoclave are purged free from air as described in Examples I and II. The heating chamber and autoclave are heated by means of steam and Dowtherm vapors, respectively. When the temperature in the autoclave reaches 175° C., the steam passing into the heating chamber is turned off and valve 37 is opened. The degradation of the waste yarn gradually takes place and the resulting fluid mass flows into the autoclave and mixes with the hexamethylene diammonium sebacate solution. Valve 37 is closed and the mixture in the autoclave is polymerized in a manner similar to that of Examples I and II, producing an interpolymer of polyhexamethylene adipamide and polyhexamethylene sebacamide. The interpolymer is extruded and cut into flakes suitable for subsequent melt extrusion.

EXAMPLE V

Four parts of caprolactam and 6 parts of distilled water are charged into the autoclave. Valve 37 is closed. Then 6 parts of polyhexamethylene adipamide yarn and 4 parts of distilled water are charged into the heating chamber. Degradation of the polyhexamethylene adipamide yarn is carried out in much the same manner as described in Examples I and II and the resulting fluid mass is passed into the autoclave through conduit 35. The mixture in the autoclave is then polymerized as described in Example I to produce an interpolymer of polyhexamethylene adipamide and caprolactam polymer, except that at the end of the cycle the interpolymer is evacuated for a period of two hours while maintaining a temperature of 275° C. The interpolymer is extruded and cut into flakes suitable for subsequent melt extrusion.

EXAMPLE VI 124 parts of ethylene glycol, 292 parts of adipic acid, and 460 parts of distilled water are charged into the autoclave. Valve 37 is closed. Then 73 parts of polyhexamethylene adipamide yarn and 30 parts of distilled water are charged into the heating chamber. The polyhexamethylene adipamide yarn and is degraded in much the same manner as described in Examples I and II and the resulting fluid mass is passed into the autoclave through conduit 35. The mixture in the autoclave is then polymerized to produce a polyester-polyamide interpolymer as described in the copending application of Merlin Martin Brubaker, Robert Edward Christ, and Donald Drake Coffman, Serial No. 232,685 now Patent No. 2,224,037.

EXAMPLE VII

A quantity of waste fabric containing a mixture of cotton yarn and yarn prepared from an interpolyamide of polyhexamethylene adipamide and caprolactam is placed in a heating chamber such as 11, shown in Figures 1 and 2 of the drawings. A 70% ethyl alcohol-30% water mixture is charged into the autoclave 39. The autoclave is heated, distilling an ethyl alcohol-water mixture up through conduit 35 into heating chamber 11. The interpolyamide component of the waste fabric is dissolved by the ethyl alcohol-water mixture and is carried down into the autoclave. When all of the interpolyamide has been washed into the autoclave, valve 37 is closed and the ethyl alcohol and water are distilled off, leaving the recovered interpolyamide, which may be extruded or otherwise removed from the autoclave. The recovered interpolyamide is useful for various purposes, such as in coating compositions, films, fibers, etc.

EXAMPLE VIII 65 parts of distilled water are charged into the autoclave. 35 parts of distilled water, 50 parts of waste polyhexamethylene adipamide yarn, and 50 parts of waste polyhexamethylene sebacamide yarn are charged into the heating chamber. The waste yarn is degraded in much the same manner as described in Examples I and II and the fluid mass is passed into the autoclave where it is repolymerized to produce an interpolyamide of polyhexamethylene adipamide and polyhexamethylene sebacamide. The interpolyamide is useful for films, coatings, etc.

The heating chamber and autoclave, or any other type of heating apparatus used to carry out the present invention, may be heated in any desired manner; e. g., by steam, by electrical heating elements, by Dowtherm vapors, or the like. The method of heating the heating chamber by means of steam, whereas the autoclave is heated by Dowtherm vapors, as disclosed in the examples, is used for economic reasons only and is to be considered in no sense limitative of the invention. The steam used in the degradation of the yarn may be generated in the heating chamber or autoclave, or it may be passed thereto from any other source.

The combination of heating chamber and autoclave has been found to operate very advantageously in carrying out the depolymerization and repolymerization of synthetic linear polyamide material. Yarn has a bulking value of about 16 pounds per cubic foot and unless it is compressed and baled, only about one fourth of a normal repolymerization charge for an autoclave can be remade into the polymer in one run. It is possible by means of the present combination to depolymerize several batches in a heating chamber and permit the same to pass into the autoclave before repolymerization of the degraded mass is carried out.

If the waste yarn were charged directly into the autoclave, the autoclave would have to be cooled to at least 100° C. before it could be opened to the air for recharging; otherwise, the polymer remaining on the walls of the autoclave would darken on exposure to air and discolor the next batch of polymer. By use of the heating chamber in combination with the autoclave, the waste polyamide can be recharged and depolymerized much more advantageously and with much greater dispatch. The heating chamber may be cooled while polymerization is taking place in the autoclave and therefore does not slow down the rate of production.

It may be desirable to use a plurality of heating chambers in conjunction with a single autoclave. It is also contemplated that one large heating chamber might be used for the degradation of sufficient waste polyamide to charge a plurality of autoclaves with the degraded fluid mass of polyamide for repolymerization in the latter devices.

It has been found preferable to introduce some water into the heating chamber along with the yarn in order to aid in the heating of the yarn and to facilitate the reading, or recording of the temperature in the heating chamber. However, the yarn may be degraded and recovered without adding water to the heating chamber along with the yarn, but depending entirely on steam passing to the heating chamber from the autoclave or some other source to furnish the moisture necessary for the degradation of the yarn to a fluid mass.

It has been found preferable to heat the yarn and water mixture in the heating chamber to a given temperature (approximately 160° C.) before introducing steam into the heating chamber from the autoclave. If this is not done, too much steam from the autoclave condenses in the heating chamber in heating it to the required temperature; consequently, too much water is introduced into the autoclave for practical preparation of polymer. However, it is possible, although not highly practicable as a plant process, to recover polymer successfully by using steam from the autoclave as the sole source of heat and/or water for the waste yarn in the heating chamber.

The ratio of waste yarn, or other source of polyamide to be depolymerized, to water which has been found to work best in the recovery of synthetic linear polyamides is 1:1. The preferred distribution of waste yarn and water at the beginning of operation of the apparatus above described is as follows: 1 part waste yarn in the heating chamber, 0.35 part of water in the heating chamber and 0.65 part of water in the autoclave. However, the above-mentioned ratio of waste yarn to water is not to be considered as limitative of the invention. It is only necessary that sufficient water be present to hydrolyze the amide linkages of the polyamide to produce molecules of sufficiently low molecular weight to form a fluid mass. The presence of an excess quantity of water will not prevent the operation of the process since the excess water will be bled from the autoclave in the process of depolymerization and repolymerization of the product. An excess of water may be used to facilitate heating the waste yarn.

In order to obtain a sufficient degree of depolymerization of the polyamide, it has been found preferable in the case of polyhexamethylene adipamide that the temperature of the water and synthetic linear polyamide in the heating chamber be maintained at a temperature of between 200° and 210° C. for approximately 1 hour. This temperature range should not be considered as limitative of the present invention; however, for it is possible to degrade the polyamide at any higher temperature, for example, up to 300° C. saturated steam, at which temperature the pressure is 1200 lbs. per square inch and is about as high as is convenient to use, or at a lower temperature, particularly in the case of a polyamide having a low melting point.

For polyamides having relatively low melting points such as polyhexamethylene sebacamide, polydecamethylene sebacamide, and interpolymers prepared from hexamethylene diamine, adipic acid, and caprolactam, considerably lower temperatures may be used in the heating chamber to degrade the polyamide to a fluid mass. One skilled in the art can by experimentation determine the optimum temperature at which to degrade the polyamide.

Recovery of polymer using a liquid of such a nature and temperatures high enough to cause degradation of the polymer, followed by repolymerization is much to be preferred to recovery using solvents and temperatures such that the polymer is merely dissolved without degradation, and concentrated in the autoclave by evaporation of the solvent, because the viscosity of solutions of nondegraded synthetic linear polyamides is of such high viscosity that flow is very slow, and thus transfer from the heating chamber to the autoclave is very slow. Likewise, removal of the solvent is a tedious process. Thus, while solvents such as phenol or in the case of certain low melting polymers, alcohol and chlorinated hydrocarbon mixtures, alcohol and water, or water alone may be used for recovery without degradation, the cycle is very long and uneconomic.

For simplicity and convenience, the invention has been discussed with particular reference to polyhexamethylene adipamide. Nevertheless, it is to be understood that other synthetic linear polyamides may be recovered in a similar manner. Among others, the following simple polyamides may be recovered according to the invention: polyhexamethylene adipamide, polyhexamethylene sebacamide, polydecamethylene adipamide, polydecamethylene sebacamide, polytetramethylene adipamide, polytetramethylene sebacamide, caprolactam polymer, 6-amino-caproic acid polymer, 9-aminononanoic acid polymer, etc. Numerous diamines, such as hexamethylene diamine, decamethylene diamine, tetramethylene diamine, octamethylene diamine, etc. may be added during the recovery process. Various dibasic acids, such as adipic acid, sebacic acid, etc. may be added. Numerous glycols, such as ethylene glycol, propylene glycol, penta glycol, trimethylene glycol, hexamethylene glycol, decamethylene glycol, etc., may be added to produce polyester-polyamide products. Also, aromatic, hydroaromatic or aromatic aliphatic dihydric alcohols may be used for this purpose. The invention is also applicable to other synthetic linear polymers which are capable of being prepared by a condensation reaction with the resultant splitting out of molecules of water (or other small molecules) to form high molecular weight polymers. It is to be understood that, degrading liquids other than water, for example, methanol, ethanol, glycol and other alcohols may be used to achieve the degradation. Of course, the use of such liquids would require the use of special repolymerization methods in case repolymerization were desired. Also it is possible in certain cases to use a mixture of such depolymerizing agents with water or other depolymerizing agents. Interpolymers of various kinds may also be recovered in accordance with the principles of this invention. Interpolymers also may be made by recovering two different polymers at once, or by adding the salt or other polyamide intermediate to the degraded polymer prior to repolymerization.

It is sometimes desirable to prepare a polyamide having a higher viscosity than that of the original waste polyamide. In the case of polymers stabilized with monobasic acids such as acetic acid or dibasic acids such as adipic acid, this may be done by adding a small amount of diamine to the autoclave (or to the heating chamber if desired) prior to or during repolymerization. By experimentation one skilled in the art can readily determine the quantity of diamine to add in order to produce a polyamide of the desired viscosity. Likewise, in the case of polymers stabilized with monobasic or dibasic amines, dibasic acid may be added to increase the viscosity. Other stabilizers, such as salts of diamines, for example hexamethylene diammonium acetate (the salt of hexamethylene diamine and acetic acid), or monobasic acids or amines such as acetic acid or dodecyl amine, may be added to produce a polyamide of lower viscosity than that of the original waste polyamide.

It is to be understood that various steps may be necessary in preparing the waste yarn before charging the same into the heating chamber depending on the source of the yarn. Soap solutions of various kinds and concentrations may be used for this purpose. Other detergents and cleansing agents may be required. Solvents may be necessary to remove oils, finishes, or other contaminating agents which would not react properly in the autoclave treatment. It is sometimes found that foreign particles such as ring travelers become mixed with the waste yarn. Such objects are usually removed by straining the same through the screen 16 at the bottom of the heating chamber. By the process of this invention, it is possible to remove resins and other water-insoluble materials (solid or semi-solid) from polyamides by converting the polyamide to a fluid and separating it from the other constituent as above described. Other liquids than water may be used to remove resins and other materials which are insoluble in such other liquids.

While the invention has been described particularly with respect to the recovery of waste yarn resulting from occurrences in the manufacture which cause the yarn to be inferior, it should be clearly understood that the invention is not to be limited to the recovery of such yarns. It is possible in accordance with the principle of this invention, to recover polyamide from fabrics of various kinds. For example, stockings prepared from polyhexamethylene adipamide may be subjected to various treatments for removal of substances other than the polyamide, then degraded and remade into polymer, spun into yarn, and knitted into new stockings. Polyamide may be recovered from mixed fabrics or mixed yarns or fibers such as mixture of cotton and polyhexamethylene adipamide yarns or fibers. The polyamide may be degraded and the fluid mass containing the depolymerized polyamide filtered from the cotton. Also, polyamides may be recovered from scrap produced in molding and turning operations. It is to be understood that this invention encompasses the recovery of polyamides from any sources of the polyamides by degradation with steam or water or other depolymerizing agents to a fluid mass followed by repolymerization to a desirable polymer.

In cases where it is more convenient to use the solvent method of recovery, such as is described in Example VII, it is usually desirable that a solvent be chosen which will not dissolve the other components of the waste material; for otherwise the recovered polymer would be contaminated by the other components. In some cases, however, it may be desirable to obtain a mixture of a polymer with one or more other polymer components or with other types of components of the waste material by using a solvent in which the several components are soluble. Various commonly used solvents may be useful in accordance with this method, for example, ethanol, methanol, ethanol-water mixtures, methanol-water mixtures, methanol-chloroform mixtures, cresols, phenols, formic acid, various chlorinated hydrocarbons, etc.

The polymer recovered in accordance with this invention may contain modifying agents, such as luster-modifying agents, plasticizers, pigments and dyes, antioxidants, resins, etc. Such modifying agents may also be added to the autoclave during the recovery process. It is preferred to add the delustering agent, such as titanium dioxide, or other pigments, as a slurry in water to the autoclave at the beginning of the polymerization cycle when all of the polymer-forming materials are present in the autoclave. However, the delustering agent may be incorporated in the polymer at various other points during the preparation of the polymer or the subsequent shaping of it.

Polymers recovered in accordance with this invention may be blended in any proportions with new polymer (that is, polymer prepared from new ingredients, such as a newly prepared polyamide prepared from a fresh batch of a diamine and a fresh batch of a dibasic acid) or likewise in any proportions with other recovered polymers.

This invention makes possible great savings in the manufacture of shaped articles from synthetic linear polymers. Some of the yarn produced in the conventional manufacturing process is inferior because of broken filaments, uneven denier, and other undesirable characteristics. Without this recovery process, this yarn would have to be discarded or sold at exceedingly low prices. In accordance with this invention, it can now be recovered and formed anew into good yarn or other shaped articles such as bristles, fishing lines and leaders, tennis strings, and numerous other useful products. The yarn obtained from the recovered polymer has as good tenacity as does yarn prepared from new polymer. Moreover, yarn spun from polymer recovered by depolymerizing with water and then repolymerizing frequently has a much smaller proportion of flecks than yarn spun from the original polymer. A fleck is a type of defect in a filament occurring during spinning in which for a short length (about 1 to 2 millimeters) the diameter is abnormally high. Synthetic linear polyamide yarns are cold drawn to orient the molecules along the fiber axis. A fleck is more resistant to cold drawing than the adjacent parts of the filament and frequently causes the filament to break at a point immediately adjacent to the fleck during cold drawing. However, yarns having a high proportion of defects due to flecks and a consequent high proportion of broken filaments can be put through the recovery process of this invention with the subsequent production of yarns from the recovered polymer which have a greatly reduced proportion of defects due to flecks. The table illustrates the marked improvement produced in several polyamide yarns recovered using water as the depolymerizing agent.

Table

| | Polymer | Average of defects per 1,000 yards of yarn | |
|---|---|---|---|
| | | Before recovery | After recovery |
| 1 | Polyhexamethylene adipamide | 11.2 | 1.0 |
| 2 | do | 11.8 | 1.1 |
| 3 | do | 14.0 | 1.1 |
| 4 | do | 13.8 | 1.1 |

This is a very great advantage; for it has not been heretofore possible to reduce the number of flecks produced by a given polymer. It is very surprising that a process for recovering a waste material results in a product which is superior to the original. This is another reason for preferring the use of water under degrading conditions for polymer recovery.

Another great advantage to the process of this invention is the opening up of the great possibilities of recovering the polymer from used articles. The yarn in stockings, for instance, is by no means deteriorated to the point of being useless when the stocking has become unusable as such, for the polymer may be recovered in accordance with the principle of this invention and made into high grade stockings again. These considerations are especially important in view of the high original cost of the ingredients used in preparing the synthetic linear polyamides.

As it is evident that many changes and modifications can be made in the above-described details of this invention without departing from the nature and spirit of the invention, it is to be understood that the invention is not to be limited to these details except as set forth in the appended claims.

We claim:

1. The process which comprises heating a solid synthetic linear polyamide in a confined space, heating water in a second confined space to form steam having a sufficiently elevated temperature to depolymerize said polyamide, passing said steam from said second confined space to said first confined space to depolymerize said polyamide to a fluid mass, passing said fluid mass to said second confined space, and subjecting said mass in said second confined space to polymerizing conditions.

2. The process which comprises heating a solid synthetic linear polyamide, in the presence of water, in a confined space, heating water in a second confined space to form steam having a sufficiently elevated temperature to depolymerize said polyamide, passing said steam from said second confined space to said first confined space to depolymerize said polyamide to a fluid mass, passing said fluid mass to said second confined space, and subjecting said mass in said second confined space to polymerizing conditions.

3. The process which comprises heating a solid synthetic linear polyamide containing a quantity of extraneous inert solid material in a confined space, heating water in a second confined space to form steam having a sufficiently elevated temperature to depolymerize said polyamide, passing said steam from said second confined space to said first confined space to depolymerize said polyamide to a fluid mass, passing said fluid mass to said second confined space, removing the extraneous solid material from said fluid mass as it passes from said first confined space to said second confined space, and subjecting said mass in said second confined space to polymerizing conditions.

4. The process which comprises charging a solid synthetic linear polyamide into a confined space, charging water into a second confined space, purging said confined spaces of air, heating said polyamide, in the said first confined space, heating the water in said second confined space to form steam having a sufficiently elevated temperature to depolymerize said polyamide, passing said steam from said second confined space to said first confined space to depolymerize said polyamide to a fluid mass, passing said fluid mass to said second confined space, and subjecting said mass in said second confined space to polymerizing conditions.

5. The process which comprises charging a solid synthetic linear polyamide and water into a confined space, charging water into a second confined space, purging said confined spaces of air, heating said polyamide and water in said first confined space, heating the water in said second confined space to form steam having a sufficiently elevated temperature to depolymerize said polyamide, passing said steam from said second confined space to said first confined space to depolymerize said polyamide to a fluid mass, passing said fluid mass to said second confined space, and subjecting said mass in said second confined space to polymerizing conditions.

6. The process as defined in claim 1 in which the polyamide is in a fibrous form.

7. The process as defined in claim 2 in which the heating of the polyamide in the first-named confined space is carried out in the absence of oxygen.

AUSTIN G. EDISON.
WINFIELD W. HECKERT.